United States Patent
Noda (10) Patent No.: US 10,182,562 B2
(45) Date of Patent: *Jan. 22, 2019

(54) FISHING ROD

(71) Applicant: Globeride, Inc., Tokyo (JP)

(72) Inventor: Takahito Noda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 223 days.

This patent is subject to a terminal disclaimer.

(21) Appl. No.: 14/576,786

(22) Filed: Dec. 19, 2014

(65) Prior Publication Data

US 2015/0181849 A1 Jul. 2, 2015

(30) Foreign Application Priority Data

Dec. 27, 2013 (JP) ................................. 2013-272426

(51) Int. Cl.
*A01K 87/00* (2006.01)
*A01K 87/02* (2006.01)

(52) U.S. Cl.
CPC .............. *A01K 87/00* (2013.01); *A01K 87/02* (2013.01)

(58) Field of Classification Search
CPC ................................ A01K 87/00; A01K 87/02
USPC ................. 43/18.1 R, 18.5, 18.1 CT
See application file for complete search history.

(56) References Cited

U.S. PATENT DOCUMENTS

| | | | |
|---|---|---|---|
| 2,749,643 A | 6/1956 | Scott | |
| 3,461,593 A * | 8/1969 | Martuch | A01K 87/00 43/18.5 |
| 3,953,637 A | 4/1976 | Phillips | |
| 4,015,360 A * | 4/1977 | Herter | A01K 87/00 43/18.5 |
| 4,070,127 A * | 1/1978 | Loomis | A01K 87/02 43/18.5 |
| 4,083,140 A * | 4/1978 | Van Auken | A01K 87/00 43/18.5 |
| 4,157,181 A | 6/1979 | Cecka | |
| 4,178,713 A * | 12/1979 | Higuchi | A01K 87/00 43/18.5 |
| 4,468,270 A * | 8/1984 | Green | B29C 53/562 43/18.5 |

(Continued)

FOREIGN PATENT DOCUMENTS

CN 103782978 A * 5/2014
EP 0826481 A2 3/1998

(Continued)

OTHER PUBLICATIONS

Translation of JP5155083.*

(Continued)

*Primary Examiner* — Darren W Ark
(74) *Attorney, Agent, or Firm* — Pillsbury Winthrop Shaw Pittman, LLP (57) ABSTRACT

To provide a fishing rod having a tip whose bending strength is improved and breakage is prevented with unexposed end surfaces of reinforced fibers of the tip on a tapered surface thereof. A fishing rod according to the disclosure includes a solid tip made of a fiber-reinforced resin material in which reinforced fibers are continuously disposed along an axial direction, the tip is tapered toward a distal end. A covering layer made of a fiber-reinforced resin in which short fibers are dispersed in a matrix resin material is formed on the surface of the tip.

9 Claims, 7 Drawing Sheets

(56) References Cited

U.S. PATENT DOCUMENTS

| | | | |
|---|---|---|---|
| 4,653,216 A | | 3/1987 | Foote |
| 4,685,241 A | * | 8/1987 | Foote .................. A01K 87/00 43/18.5 |
| 4,759,147 A | * | 7/1988 | Pirazzini ............. A01K 87/00 43/18.5 |
| 4,860,481 A | * | 8/1989 | Christenson ......... A01K 87/00 43/18.5 |
| 4,876,143 A | | 10/1989 | Sugita |
| 4,885,865 A | | 12/1989 | Rumbaugh |
| 5,076,004 A | | 12/1991 | Sunaga et al. |
| 5,239,768 A | | 8/1993 | Michishita |
| 5,328,742 A | | 7/1994 | Tukihara |
| 5,338,604 A | | 8/1994 | Yasui |
| 5,529,731 A | * | 6/1996 | Bendick ............. B29C 44/1209 156/173 |
| 5,686,155 A | | 11/1997 | Suzue |
| 5,721,030 A | | 2/1998 | Okada |
| 5,964,056 A | * | 10/1999 | Grice .................. A01K 87/00 43/18.5 |
| 6,088,947 A | | 7/2000 | Suzue |
| 6,106,413 A | | 8/2000 | Kusumoto |
| 6,148,558 A | * | 11/2000 | Ono .................... A01K 87/00 43/18.1 R |
| 6,286,244 B1 | | 9/2001 | Weiss |
| 6,301,821 B1 | | 10/2001 | Suzue |
| 6,524,195 B1 | * | 2/2003 | Kusumoto ............ A63B 53/10 43/18.5 |
| 6,601,334 B1 | * | 8/2003 | Ono .................... A01K 87/00 43/18.5 |
| 6,709,347 B1 | * | 3/2004 | Ono .................... A01K 87/00 43/18.5 |
| 7,305,792 B2 | * | 12/2007 | Kato .................... A01K 87/00 43/18.5 |
| 7,584,571 B2 | | 9/2009 | Ryan |
| 7,888,275 B2 | | 2/2011 | Ward et al. |
| 8,001,716 B1 | * | 8/2011 | Lepage ................ A01K 87/00 43/18.5 |
| 9,949,466 B2 | * | 4/2018 | Noda .................. A01K 87/00 |
| 10,034,465 B2 | * | 7/2018 | Noda .................. A01K 87/00 |
| 2004/0200123 A1 | | 10/2004 | Whiting |
| 2005/0178040 A1 | | 8/2005 | Kato |
| 2005/0223617 A1 | * | 10/2005 | Morita ................. A01K 87/00 43/18.5 |
| 2006/0185218 A1 | * | 8/2006 | Whiting .............. A01K 87/00 43/18.5 |
| 2007/0039229 A1 | * | 2/2007 | Wang .................. A01K 87/00 43/18.1 R |
| 2010/0189963 A1 | | 7/2010 | Nair |
| 2015/0150227 A1 | * | 6/2015 | Noda .................. A01K 87/04 43/18.5 |
| 2015/0181850 A1 | * | 7/2015 | Noda .................. A01K 87/00 43/18.5 |
| 2016/0183505 A1 | * | 6/2016 | Noda .................. B29C 70/202 43/18.1 CT |
| 2018/0132462 A1 | * | 5/2018 | Noda .................. A01K 87/00 |

FOREIGN PATENT DOCUMENTS

| | | | | |
|---|---|---|---|---|
| EP | 2888937 A1 | * | 7/2015 | ............. A01K 87/00 |
| FR | 2892892 A1 | | 5/2007 | |
| GB | 1 393 102 | | 5/1975 | |
| GB | 1393102 A | * | 5/1975 | ............. A01K 87/00 |
| GB | 2 064 420 | | 6/1981 | |
| GB | 2064420 A | * | 6/1981 | ............. A01K 87/00 |
| GB | 2 249 006 A | | 4/1992 | |
| GB | 2511905 A | | 9/2014 | |
| JP | 54-80372 | | 6/1979 | |
| JP | 58-211442 | | 12/1983 | |
| JP | 60-212334 | | 10/1985 | |
| JP | 60-212335 A | | 10/1985 | |
| JP | 6-197669 A | | 7/1994 | |
| JP | 09-056301 | | 3/1997 | |
| JP | 9-248103 | | 9/1997 | |
| JP | 09248103 A | * | 9/1997 | |
| JP | 2000-93559 A | | 4/2000 | |
| JP | 2000093559 A | * | 4/2000 | |
| JP | 2001037378 A | * | 2/2001 | |
| JP | 2001-190185 A | | 7/2001 | |
| JP | 2001-275520 A | | 10/2001 | |
| JP | 2002233274 A | * | 8/2002 | |
| JP | 2003-102344 | | 4/2003 | |
| JP | 2003102344 A | * | 4/2003 | |
| JP | 3511559 B2 | | 3/2004 | |
| JP | 3582778 B2 | | 10/2004 | |
| JP | 3582778 B2 | * | 10/2004 | |
| JP | 2006-34292 A | | 2/2006 | |
| JP | 2006-101779 A | | 4/2006 | |
| JP | 3884253 B2 | | 2/2007 | |
| JP | 2007-209301 A | | 8/2007 | |
| JP | 2009-60916 A | | 3/2009 | |
| JP | 2009-207357 | | 9/2009 | |
| JP | 5155083 B2 | * | 2/2013 | |
| JP | 5155083 B2 | | 2/2013 | |
| KR | 100359183 | | 10/2002 | |
| KR | 20100126611 A | * | 12/2010 | |

OTHER PUBLICATIONS

Translation of JP200093559.*
English Translation of Abstract for CN 103782978 A.*
Japanese Office Action dated Sep. 29, 2016 for Appln. No. 2013-272426.
Chinese Office Action dated Sep. 1, 2016 for Appln. No. 201410830233.4.
Extended European Search Report dated Apr. 10, 2015 for Appln. No. 14200034.8.
Communication pursuant to Article 94(3) EPC EP Appln. No. 14195379.4 dated Jan. 18, 2017.
Extended European Search Report EP Appln. No. 14195379.4 dated Apr. 9, 2015.
Extended European Search Report EP Appln. No. 14200451.4 dated Apr. 9, 2015.
Extended European Search Report EP Appln. No. 15201502.0 dated May 9, 2016.
Second Office Action Chinese Patent Appln. No. 201410830233.4 dated Apr. 25, 2017 w/English translation.
Third Office Action Chinese Patent Appln. No. 201410830233.4 dated Sep. 6, 2017 w/English translation.
First Office Action Chinese Patent Appln. No. 201410686908.2 dated Jul. 18, 2016 w/English translation.
First Office Action Chinese Patent Appln. No. 201410828614.9 dated Jul. 18, 2016 w/English translation.
Office Action Korean Patent Application No. 10-2014-0164944 dated Jun. 8, 2017 w/English translation.
Office Action Korean Patent Application No. 10-2014-0185844 dated Jun. 15, 2017 w/English translation.
Office Action Korean Patent Application No. 10-2015-0186205 dated Nov. 15, 2017 w/English translation.
Office Action Japanese Patent Application No. 2013-247568 dated Oct. 13, 2016 with English translation.
Office Action Japanese Patent Application No. 2013-272429 dated Sep. 29, 2016 w/English translation.
English translation JP 2003-102344.
Chinese Office Action in connection with Chinese Patent Application No. 201410828614.9 dated Feb. 23, 2017 and English translation thereof.
Office Action Korean Patent Application No. 10-2014-0185844 dated Dec. 21, 2017 w/English translation.
Office Action Korean Patent Application No. 10-2014-0185852 dated Dec. 26, 2017 w/English translation.
Office Action Korean Patent Application No. 10-2014-0164944 dated Dec. 21, 2017 w/English translation.
Office Action Chinese Patent Application No. 2015109540673 dated Dec. 12, 2017 with English translation.
Second Office Action Chinese Patent Application No. 201410686908.2 dated Jan. 12, 2017 with English translation.

(56) References Cited

OTHER PUBLICATIONS

Third Office Action Chinese Patent Application No. 201410686908.2 dated Jul. 7, 2017 with English translation.
Non-Final Office Action Korean Patent Application No. 10-2014-0185852 dated Jun. 12, 2017 with English translation.
Third Office Action Chinese Patent Application No. 201410828614.9 dated Jun. 28, 2017 with English translation.
Fourth Office Action Chinese Patent Application No. 201410686908.2 dated Feb. 2, 2018 with English translation.
Communication pursuant to Article 94(3) EPC EP Application No. 15201502.0 dated Apr. 19, 2018.

* cited by examiner

FISHING ROD

CROSS-REFERENCE TO RELATED APPLICATIONS

This application is based on and claims the benefit of priority from Japanese Patent Application Serial No. 2013-272426 (filed on Dec. 27, 2013), the contents of which are hereby incorporated by reference in their entirety.

TECHNICAL FIELD

The present disclosure relates to a fishing rod, more specifically, to a fishing rod having a special feature at a tip of the rod.

BACKGROUND

A common fishing rod has a prepreg wound around the body of the rod. The prepreg is reinforced fibers extended in a specific direction and impregnated with a synthetic resin. The fishing rod has a tubular structure in order to reduce the weight of the rod. However, a tip of the rod may be made solid to obtain flexibility and to prevent damage thereon when the tip portion of the rod is largely bent by fish bites.

Japanese Patent Application Publication Nos. S54-80372 and H9-248103 disclose a solid tip made of a so-called fiber-reinforced resin material formed from a reinforced fiber (a carbon fiber, a glass fiber or the like) impregnated with a synthetic resin. The fiber-reinforced resin material is typically formed by pultrusion and the fiber is disposed continuously from a proximal end to a distal end of the tip rod. The tip rod formed as described above is tapered by grinding a surface of the tip rod in order to impart a certain type of action to the rod.

The above-mentioned conventional tip rods are made of reinforced fibers extending from a proximal end to a distal end (a continuous fiber solid body). When such tip rods are tapered by cutting, the reinforced fibers arranged in a surface area are cut and end surfaces of the fibers are exposed. When the cutting end surfaces of the reinforced fibers are exposed, chipping could easily occur from such surfaces and this leads to snapping and other breakages. Moreover, when the surfaces are frayed and if a fishing line contacts therewith, the fishing line could be damaged.

SUMMARY

The present disclosure is intended to address the above problems. An object of the present disclosure is to provide a fishing rod having a tip whose bending strength is improved and breakage is prevented with unexposed end surfaces of reinforced fibers of the tip on a tapered surface thereof.

A fishing rod according to one aspect of the present disclosure may include a solid tip made of a fiber-reinforced resin material in which reinforced fibers are continuously disposed along an axial direction; and a covering layer formed on the surface of the tip, wherein the tip is tapered toward a distal end and the covering layer is made of a fiber-reinforced resin in which short fibers are dispersed in a matrix resin material.

Because the fishing rod according to the above aspect has the solid tip made of a fiber-reinforced resin material in which reinforced fibers are continuously disposed along the axial direction and the tip is tapered toward the distal end, the fishing rod has an increased bending strength and the distal-end portion can be easily bent. Moreover, the covering layer made of the short fibers dispersed in the matrix resin material is formed on the surface of the tip. Therefore, even if the end surfaces of the reinforced fibers are exposed when the tip is processed to be tapered, the exposed end surfaces are covered with the covering layer and it is possible to prevent breakage of the tip due to chipping and the like. Furthermore, the covering layer is made of the fiber-reinforced resin material in which the short fibers are dispersed in the matrix resin material so that the bending strength of the tip can be increased and the chipping would be surely prevented. Particularly, the short fibers are dispersed and arranged anisotropically in the covering layer so that not only the bending strength but also a torsional strength of the tip can be enhanced. Note that the tapered portion of the tip tapering toward the distal end encompasses ones that include partially a straight portion, a large diameter portion, ones with a different tapering rate, ones tapered in a stepwise manner and the like.

According to the present disclosure, it is possible to provide a fishing rod having a tip whose bending strength is improved and breakage is prevented with unexposed end surfaces of reinforced fibers of the tip on a tapered surface thereof.

DESCRIPTION OF THE PREFERRED EMBODIMENTS

Figure 1:
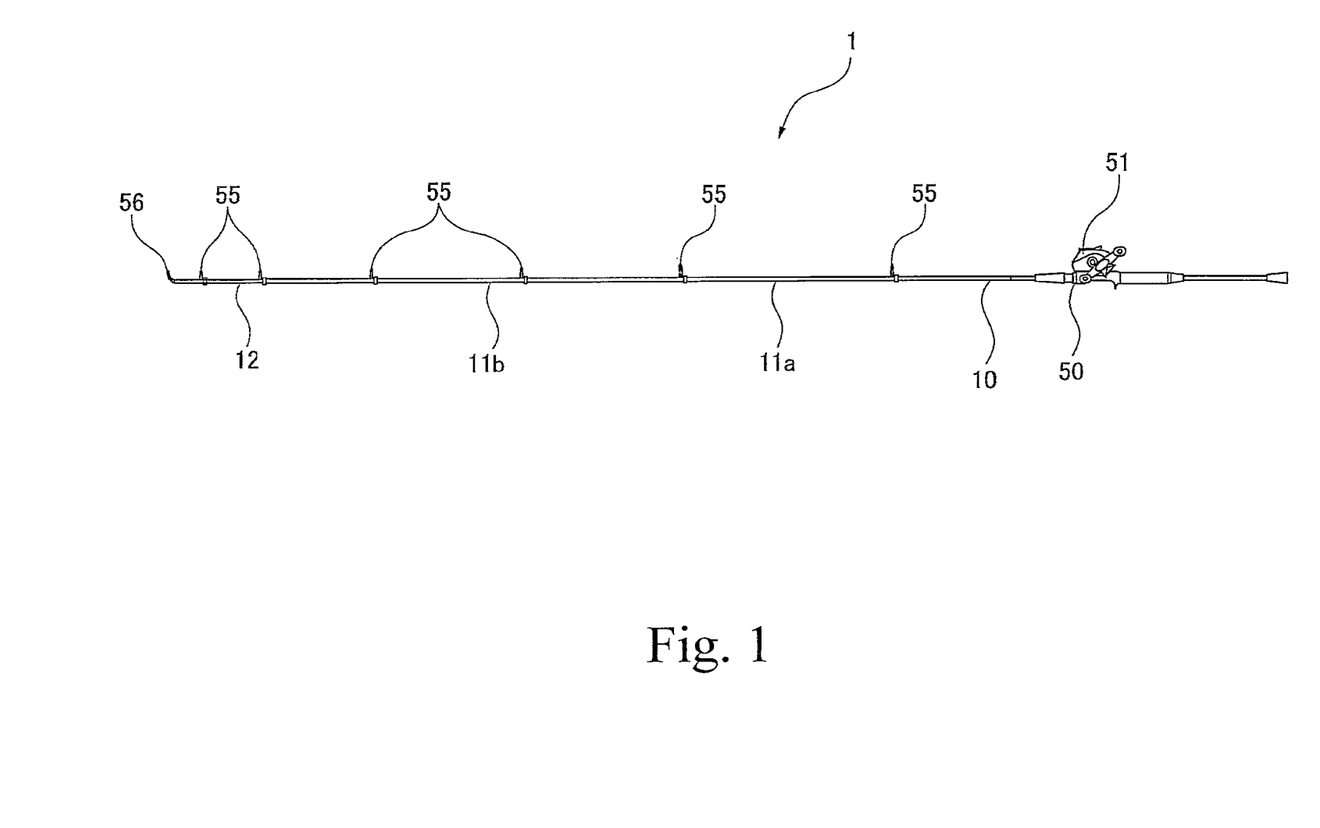
FIG. 1 is an overall view of a fishing rod according to an embodiment of the disclosure.

Embodiments of a fishing rod according to the present disclosure will be now described with reference to the drawings. FIG. 1 is an overall view of an exemplary fishing rod according to the disclosure. A fishing rod 1 according to the embodiment is a joint-type fishing rod with external guides. The fishing rod 1 may include a butt side rod 10, more than one (two) intermediate rods 11a, 11b, and a tip rod 12, and they are jointed to form a telescopic fishing rod.

The butt side rod 10 and the intermediate rods 11a, 11b may be formed as tubular bodies made of a fiber-reinforced resin material in which a synthetic resin such as an epoxy resin and a polyester resin is reinforced with a reinforcement fiber such as a carbon fiber. The fishing rod 1 illustrated in FIG. 1 may have a reel seat 50 on the butt side rod 10, external guides 55 guiding a fishing line released from a reel 51 attached on the reel seat 50, and a top guide 56 with predetermined intervals therebetween. Some of the guides may be configured to move freely and the external guides may be omitted in some embodiments. Although the telescopic fishing rod is illustrated, the fishing rods may be ordinary or inversely jointed.

Figure 2:
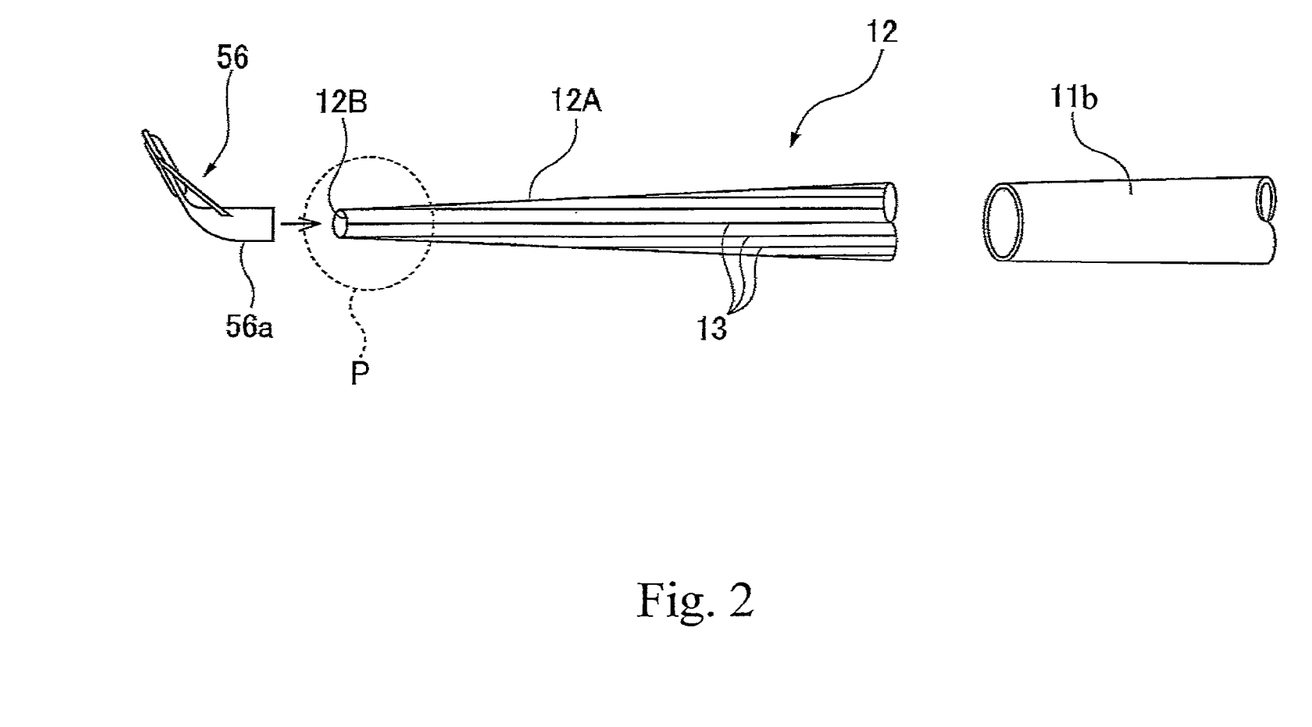
FIG. 2 is a sectional view of a tip rod of the fishing rod of FIG. 1.

FIG. 2 illustrates the tip rod 12 among the rods shown in FIG. 1. The tip rod 12 according to the embodiment has a solid body and a circular shape in cross-section. The tip rod 12 forms a tip portion of the fishing rod (hereunder the tip rod may also be referred to as the "tip") and is fitted into the intermediate rod 11*b*. As described above, the tip rod 12 is made of a so-called fiber-reinforced resin material formed from a reinforced fiber (a carbon fiber, a glass fiber or the like) impregnated with a synthetic resin. The fiber-reinforced resin material is typically formed by pultrusion and the fibers extend continuously from a proximal end to a distal end of the tip rod (the reinforced fibers 13 aligned along the axial direction from the proximal end to the distal end are shown in FIG. 2). The tip rod formed as described above has a tapered portion 12A by grinding or cutting the surface of the tip rod in order to impart a certain type of action. The reinforced fibers 13 of the tip rod may be any type of reinforced fibers provided that they present continuously from the proximal end to the distal end. Arrangement of the reinforced fibers are not limited. For example, a number of reinforced fibers that extend straight along the axial direction may be bundled, or several reinforced fibers are twisted along the axial direction and such twisted fibers may be then bundled, or a combination thereof. These reinforced fibers extending along the axial direction are cut when the tip rod is tapered by cutting or grinding, and end surfaces of the fibers are exposed.

The top guide 56 may be attached to the distal end of the tip rod 12. The top guide 56 may have a cylindrical fitting portion 56*a*. The fitting portion 56*a* may be fitted onto the distal end of the tip rod 12 along the axial direction as indicated by the arrow in the FIG. 2 and the top guide 56 may be attached to the tip rod 12.

The tip rod 12 according to the embodiment has a circular sectional shape and is made as a solid body over the length. Alternatively, the tip rod 12 may be formed to include a proximal-end side portion with a tubular body and a distal-end side portion with a solid body. In other words, the tip rod may be formed by connecting the solid distal-end portion that serves as the tip and the tubular proximal-end side portion that serve as a tip-holding pole. When the fishing rod has this structure, it is possible to increase the sensitivity at a small area of the tip portion of the tip rod. Moreover, the solid portion of the tip rod may consist of a core plate such that the tip rod tends to bend in one direction. For example, when the solid portion is made in the plate form, fishing rods equipped with such tips are appropriate for fishing pond smelts and for ones with bait reels. Alternatively, the tip rod may be tubular body instead of the solid body. The tubular body may be configured from a mandrel that has a tapered portion and a prepreg in which reinforced fibers extend along the axial direction and the prepreg is wound around the mandrel. A covering layer may be further formed on the surface of the tubular body. When the tip rod is configured in such a manner, it is possible to have a lighter weight.

Figure 3:
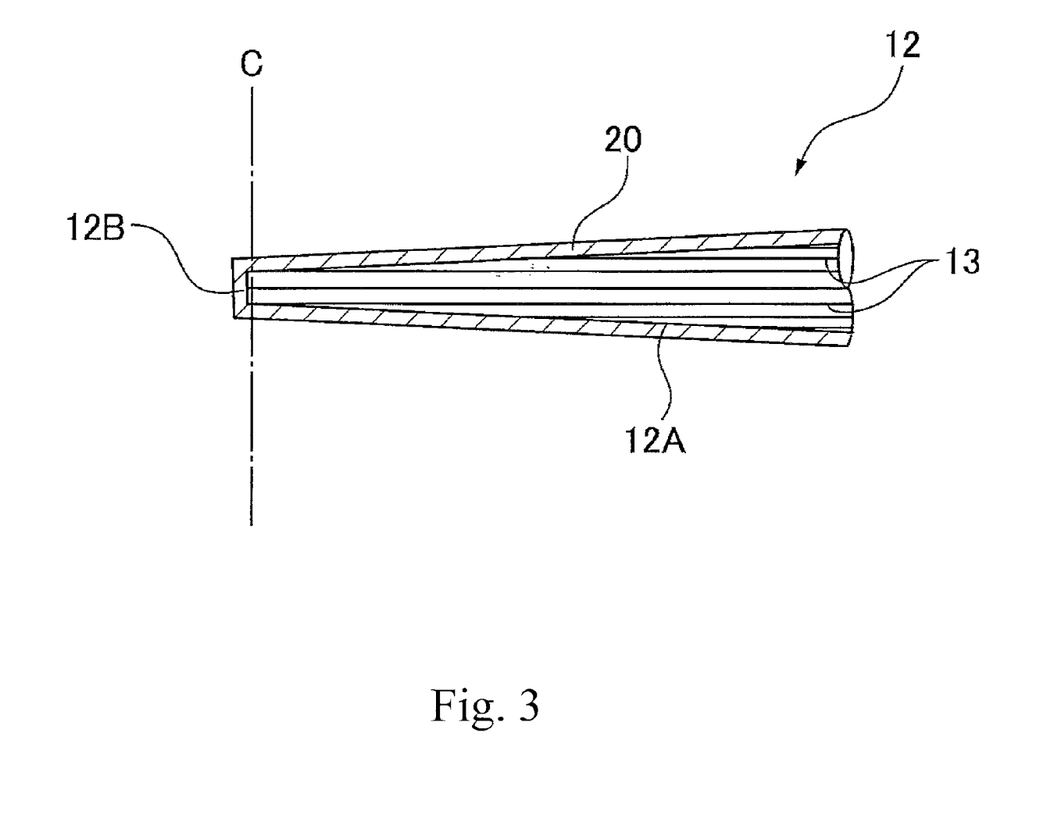
FIG. 3 is an enlarged view of the region P (a distal end region of the tip rod) of FIG. 2.
Figure 4:
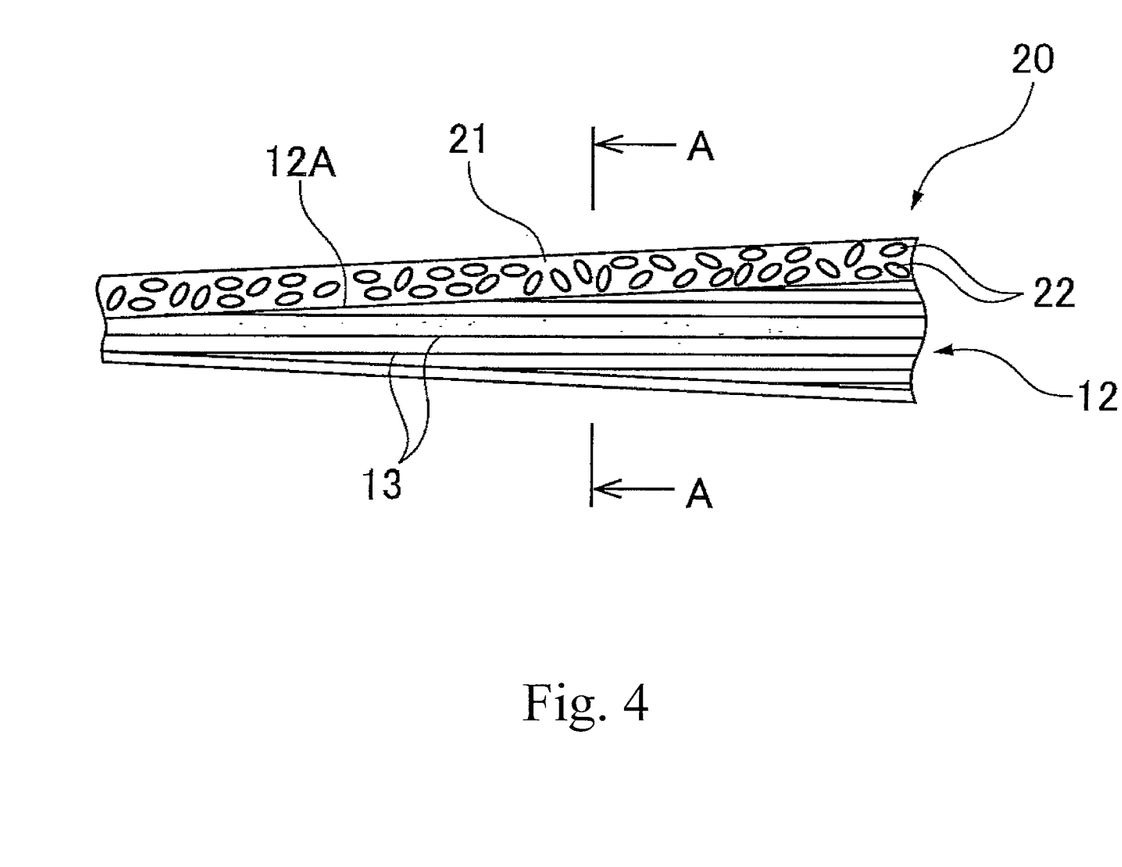
FIG. 4 is an enlarged longitudinal sectional view of essential parts of the tip rod.
Figure 5:
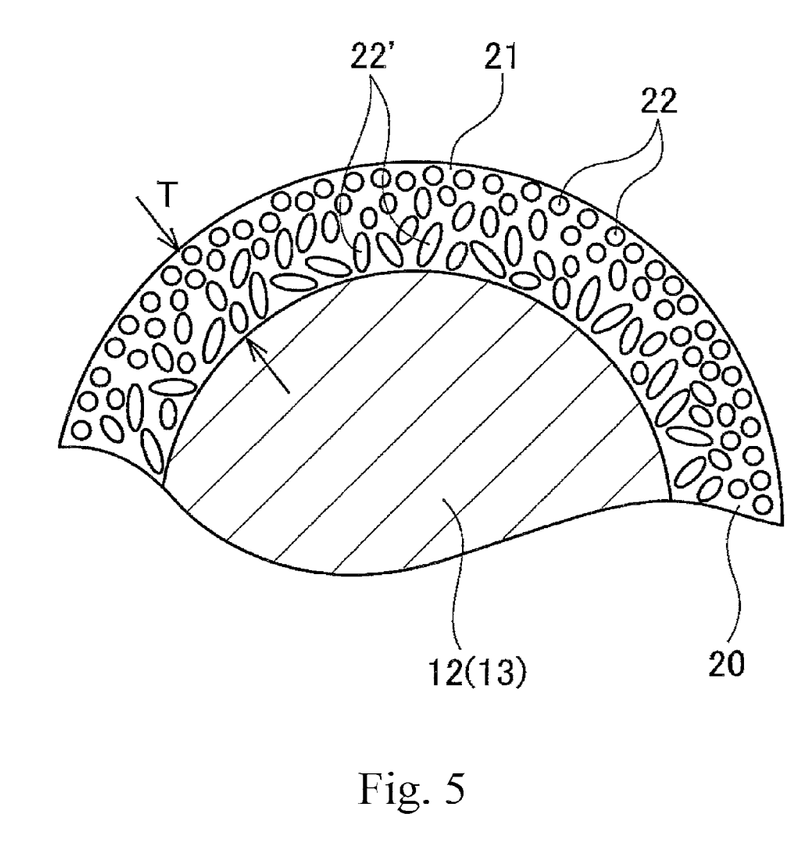
FIG. 5 is a sectional view along the line A-A in FIG. 4 to illustrates a state of reinforced fibers (short fibers) contained in a covering layer that coats the tip rod.

A covering layer 20 is formed on the surface of the tip rod 12 as shown in FIG. 3. The covering layer 20 is provided by a hereunder-described method after the taper 12A is formed on the surface of the tip rod. The covering layer 20 is coated substantially uniformly over the entire surface. The tip rod 20 may be made of a fiber-reinforced resin material in which a number of short fibers 22 serving as a reinforcing material are dispersed in a matrix resin 21 as illustrated in FIGS. 4 and 5. Examples of the matrix resin 21 include thermoplastic resins (for example, polyamide, polypropylene, polyphenylene sulfide, polyether imide) and thermosetting resins (for example, epoxy, phenole). The matrix resin 20 may be formed of mainly a polyamide resin and additionally other thermoplastic resin (polyester, polycarbonate or the like).

The matrix resin 21 may contain other supplemental material (other than the reinforcing material). For example, the tip rod can be colored by mixing a colorant such as pigment in the matrix resin, moreover the weight of the tip rod can be reduced by foaming the matrix resin to mix microbubbles therein. Moreover, it is possible to optimize injection molding of the fiber-reinforced resin material by adding a fluidity modifier, an anti-static agent, a mold releasing agent, an antioxidant, and the like.

The reinforced fibers (the short fibers 22) dispersed in the matrix resin 21 may be, for example, carbon fibers such as PAN carbon fibers and pitch carbon fibers or glass fibers. The size of each short fiber is not particularly limited. However, it is preferable that the average fiber diameter of the short fibers be 3 to 15 μm and the average fiber length of the short fibers be 0.5 to 10 mm. When the fiber diameter is smaller than 3 μm and the fiber length is shorter than 0.5 mm, the tip rod requires a large amount of fibers to obtain a desired strength. If such a large amount of fibers is mixed in the matrix resin, the fluidity at the time of molding is reduced and the short fibers cannot be uniformly distributed along the axial direction. Moreover, if the fiber diameter is larger than 15 μm and the fiber length is longer than 10 mm, the fluidity at the time of molding is also reduced although it is possible to set a content ratio of the fibers for obtaining a desired flexibility, and consequently the short fibers cannot be uniformly distributed along the axial direction. Note that all the short fibers contained in the matrix resin may not necessarily have the above-described size, some of them may be out of the above-mentioned range. In other words, as long as a large majority of the short fibers have average diameters and lengths within the above-described range, it is allowed that some short fibers have larger or smaller sizes than the sizes in the range.

It is also preferable that the content of the above-described short fibers in the matrix resin be set to 3 to 50 wt %. This is because when the content of the short fibers having the above-described dimension is less than 3 wt %, a sufficient strength cannot be obtained, whereas when the content of the short fibers exceeds 50 wt %, the fluidity at the time of molding is reduced even with the above-described sized short fibers, and consequently the short fibers cannot be uniformly distributed along the axial direction. Moreover, considering the requirements (the softness, flexibility, and strength) for the tip rod, such requirements would be satisfied when the content of the short fibers is less than 50 wt %.

If a thickness "T" of the covering layer 20 is too large, the weight of the tip rod is increased and the sensitivity and flexibility of the tip rod tend to decrease. Whereas if the thickness of the covering layer is too small, a sufficient reinforcement effect cannot be obtained and the cutting end surfaces of the reinforced fibers could be exposed. Therefore, it is preferable that the thickness of the covering layer 20 be set in the range of 0.1 to 2 mm.

The content of the short fibers in the covering layer 20 may not necessarily be distributed uniformly along the axial direction. For example, when the content is increased gradually or in a stepwise fashion toward the proximal end in the axial direction, the distal end side of the tip rod can be easily bent while the bending strength of the tip rod is enhanced.

Moreover, it is preferable that the short fibers 22 be dispersed in the matrix resin material 21 such that many of the short fibers 22 are distributed anisotropically in a radially inner region and many of the short fibers 22 are aligned along the axial direction in a radially outer region. More specifically, as shown in the sectional view of FIG. 5, when the short fibers are aligned along the axial direction, the sections of such short fibers become substantially circular shapes (see the short fibers 22 in the radially outer region). When the short fibers are arranged anisotropically, the sections of the short fibers tend to be oblong or ellipse as the short fibers are cut diagonally in section (see the short fibers 22' in the radially center region). In other words, it is possible to effectively enhance the bending rigidity of the tip rod when the short fibers in the covering layer 20 are aligned along the axial direction in the radially outer region, and therefore the tip rod can be configured to be flexible with a prescribed elastic force. In addition, it is possible to increase the torsional strength of the tip rod when the short fibers are anisotropically arranged in the inner region, and therefore it is possible to prevent breakage due to torsional stress.

Here, "many of the short fibers in the radially outer region are aligned along the axial direction" can be defined by seeing the covering layer in section and figuring out a ratio of the short fibers with circular shape sections. More specifically, supposing that a thickness of the covering layer 20 is "T" at a given position, if a ratio of the short fibers with circular sections in the radially outer region ranging from the surface to the thickness (½)T is larger than a ratio of the short fibers with circular sections in the radially inner region situated inner side than the thickness (½)T, it can be defined that many of the short fibers aligned along the axial direction are distributed in a region closer to the surface of the covering layer 20. When the covering layer 20 is configured in such a manner, it is possible to obtain a desired bending rigidity and increase the strength against torsion. The alignment of the short fibers illustrated in FIG. 5 can be realized through a hereunder-described manufacturing method.

Figure 6:
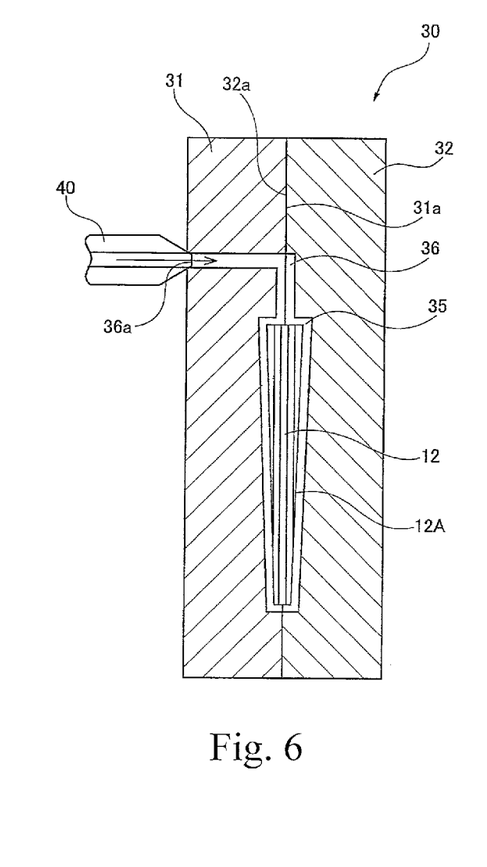
FIG. 6 illustrates an example of a mold used in a method of manufacturing the tip rod.

An example of a manufacturing method in which the above-described covering layer 20 is formed on the surface of the tip rod will be now described with reference to FIG. 6. The tip rod 12 shown in FIG. 2 is manufactured in a common manner in the field, and the surface of the tip rod 12 is tapered 12A by cutting, grinding or the like. The covering layer 20 covering the whole surface of the taper 12A is formed by insert molding. More specifically, in this embodiment, the covering layer 20 is formed by using a mold 30 including two mold parts 31, 32 that can be separated from each other at the time of demolding. On contact surfaces 31a, 32a of the mold parts 31, 32, a cavity 35 of which contour is slightly larger than the contour of the tip rod 12 is formed. The mold parts 31, 32 each have a gate 36 through which a fiber-reinforced resin is injected into a predetermined position. The gate 36 communicates with the cavity 35 and has an opening 36a extending to a side of the mold 30. A nozzle 40 of a molding machine is inserted into the opening 36a and the fiber-reinforced resin material is injected into the mold as indicated by the arrow in FIG. 6.

The mold 30 is placed such the tip rod 12 that is gradually tapered toward the distal end vertically stands and the distal end of the tip rod faces the bottom. Either the mold part 31 or the mold part 32 or both of them has a retaining portion (not shown) where the tip rod 12 is retained in the cavity 35 with the distal end of the tip rod facing the bottom. The retaining portion can be configured in any way, for example, the retaining portion may be formed by another split mold and then placed inside the cavity 35 at a prescribed position. When the tip rod 12 is retained by the retaining portion and situated inside the cavity 35, a gap corresponding to the thickness of the covering layer 20 is configured to be formed between the circumference of the tip rod 12 and an inner wall of the cavity 35.

After the tip rod 12 is placed inside the cavity 35 as described above, the nozzle is inserted through the opening 36a and the fiber-reinforced resin material is injected through the gate 36. The fiber-reinforced resin material to be injected is a thermoplastic resin that contains short fibers at a content of 3 to 50 wt %. The average fiber diameter of the short fibers is 3 to 15 μm, and the average fiber length of the short fibers is 0.5 to 10 mm. The thermoplastic resin is injected at a predetermined temperature (a thermoplastic temperature of about 200° C.). The mold 30 is kept at a temperature lower than the temperature of the fiber-reinforced resin material to be injected therein. Therefore, the injected fiber-reinforced rein material is cooled and cured from its surface contacting with the inner surface of the mold 30. More specifically, the injected fiber-reinforced resin material flows along the surface of the tip rod 12 in the axial direction and therefore the short fibers included in the resin material are aligned along the axial direction with the flow. The resin material is then cured from the surface as it flows and therefore the short fibers in a region close to the surface (the radially outer region) tend to be aligned along the axial direction. However, there is some time before the resin in the inner region (the radially inner region) is cured, and even after the flow stops (the cavity has been substantially filled up with the fiber-reinforced resin material), the short fibers in that region are allowed to move freely to some extent and consequently each of the short fibers is directed differently (see FIG. 5).

As described above, the short fibers in the outer region can be aligned along the axial direction and the short fibers in the inner region can be arranged anisotropically by adjusting the temperature difference between the fiber-reinforced resin material to be injected and the mold, and setting the injection direction (injecting vertically as described above). The arrangement of the short fibers as illustrated in FIG. 5 can be modified by changing an injection pressure of the fiber-reinforced resin material, the temperature difference between the mold and the resin material, the position of the gate, the number of the gates and the like.

It is preferable that a means to enhance adhesion between the tip rod 12 and the covering layer 20 be provided at the interface therebetween. For example, both the matrix resin of the tip rod 12 and the matrix resin of the fiber-reinforced resin material may be thermoplastic resins, and the interface between the tip rod and the covering layer 20 may be melted and bonded to each other, thereby separation from each other can be prevented. Alternatively, a woven prepreg containing glass fibers (an impregnation amount of a resin is preferably 30 to 80 wt %) may be provided at the interface and the interface may be enriched with the resin to prevent the separation. Alternatively, the surface of the tip rod 12 may be processed to increase a bonding area of the tip rod so as to increase the bonding area at the interface. More specifically, the surface may be roughened by sandblasting or the like, the surface may be scratched (dented) in a spiral pattern, a concave portion (the shape of the concave portion can be changed by selecting a type of a grind stone) may be formed on the surface by a centerless processing and the like, concave and convex portions are formed on the surface, or a stepwise taper may be formed. Alternatively, a thermoplastic resin layer that has a low viscosity than that of the matrix resin of the short fiber resin when it is heated to be melted may be provided between the tip rod and the covering layer, such a thermoplastic resin layer can serve as adhesive and the adhesion between the tip rod and the covering layer can be enhanced.

With the above-described insert molding, the uniform covering layer 20 can be easily formed on the surface of the tip rod 12 having the taper 12A. When the covering layer 20 is formed by the insert molding, the covering layer 20 is also formed on a distal-end surface 12B (see FIGS. 2 and 3) of the tip rod 12. A fitting portion 56a of the top guide 56 is fitted onto the distal-end portion of the tip rod 12 and fixed thereto. The fixing strength of the fitting portion 56a on the covering layer 20 could be decreased. To address this, after the covering layer 20 is uniformly formed on the surface of the tip rod 12, it is preferable that the covering layer 20 in the distal-end area be cut as illustrated by the cut line C in FIG. 3 to expose the reinforced fibers 13 that extend continuously in the tip rod 12. And the top guide 56 is fitted on the exposed cutting surface. In other words, by exposing the reinforced fibers 13 on the distal-end surface 12B, the fitting strength of the top guide 56 can be maintained. If the covering layer 20 is not cut along the cut line C, a joint between a portion that includes the fibers extending in the axial direction and a portion that includes the short fibers is generated, and the joint does not include the fibers extending in the axial direction so that the bending rigidity would be changed. For this reason, it is preferable that the diameter of the tip rod is partially increased in order to inhibit the change in the bending rigidity (to obtain a smooth flexure). For instance, a middle portion of the tip rod may have a straight portion by maintaining a large diameter instead of decreasing the diameter of the tip rod in order to form the tapered portion.

Other than the insert molding, two-color molding or die coating may be used to form the covering layer 20 on the surface of the tip rod 12.

The above-described tip rod 12 has the taper 12A and the reinforced fibers extend from the proximal end to the distal end. Therefore, it is possible to improve the action and to obtain a desired bending strength. Moreover, chipping caused by bending of the tip (which may result in breakage of the tip rod) can be prevented by the above-described covering layer 20 formed on the surface of the tip and it is also possible to enhance the bending strength (displacement). Moreover, instead of a simple synthetic resin, the discrete reinforced fibers (short fibers) are dispersed so that the elasticity can be enhanced, it is possible to affect the action, and the chipping can be prevented without increasing the weight. Furthermore, according to the embodiment, the surfaces of the rod will not be frayed so that the fishing lines will not be damaged.

Figure 7:
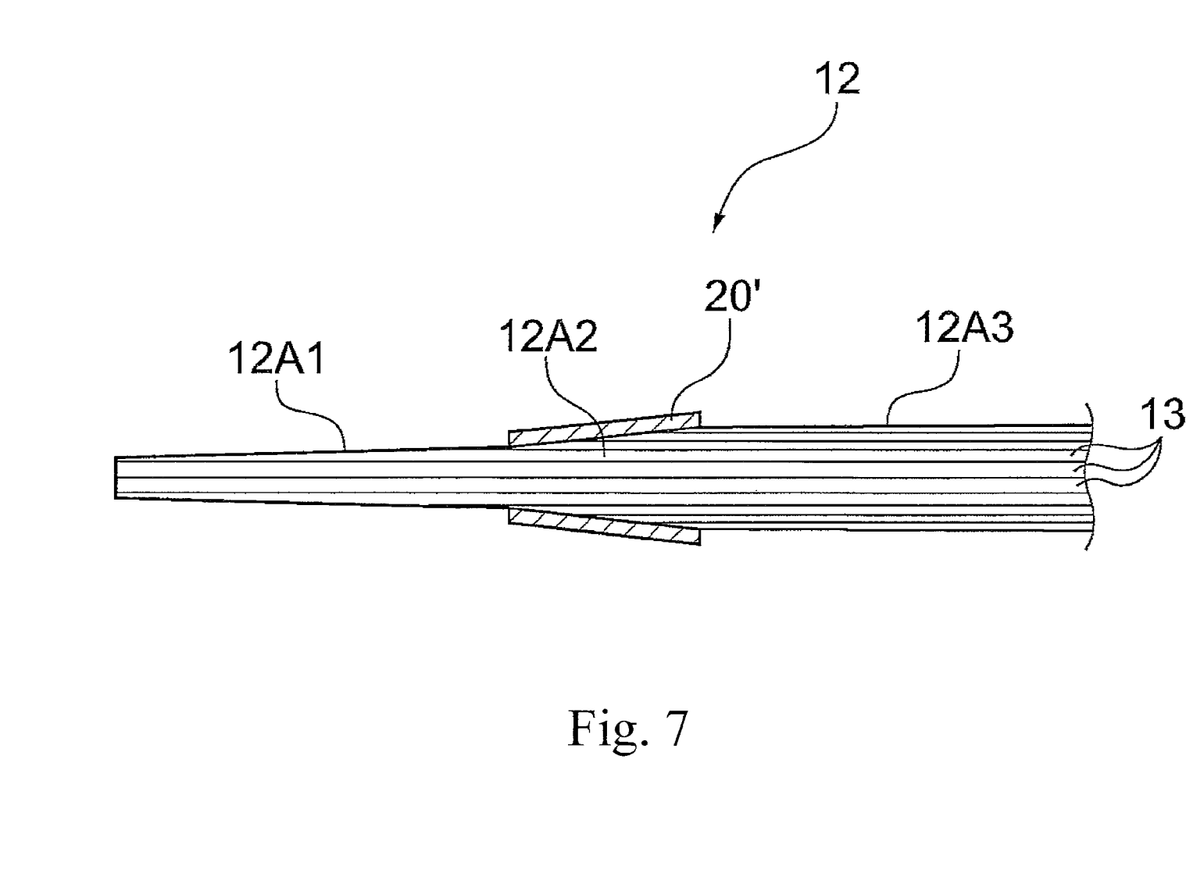
FIG. 7 is a side view of a tip rod according to another embodiment.

FIG. 7 is a side view of a tip rod according to another embodiment. The rod 12 according to this embodiment has a sharply-tapered portion 12A2 in a middle part of the rod. A distal end part of the rod 12 has a substantially straight portion 12A1 and a proximal end part of the rod 12 has a gently-tapered portion 12A3. When the tip rod 12 having such configuration is bent, the maximum flexure region is situated at the sharply-tapered portion 12A2. In other words, the tip rod 12 does not bend uniformly depending on the amounts and sizes of the tapered portions. When a certain part of the rod has a large amount of bending, the reinforced fibers extending in the axial direction and exposed at the both ends of this part tend to be turned outward. Therefore, when the rod has the maximum flexure region at a certain part of the rod, a covering layer 20' may be provided only in such a region, accordingly it is possible to efficiently prevent breakage and the like.

Moreover, the tip rod illustrated in FIG. 7 may have portions where two or more types of materials are used (the portion where the reinforced fibers are aligned along the axial direction and the portion where the short fibers are dispersed) on the surface in the axial direction, so that the bending characteristics differ. When paint is performed on a surface of such a tip rod, there may be problem in adhesion of the paint. To address this problem, it is preferable that a primer (for example, urethane resin, acrylic resin, acrylic urethane resin, epoxy resin or the like) that enhances the adhesion be applied to at least one of the portions (preferably the portion with a larger flexure). More particularly, it is preferable that the primer with a low hardness (soft) be applied to form the paint.

Embodiments of the present disclosure are not limited to the above descriptions and are susceptible to various modifications. For example, although the fishing rod according to the embodiment includes more than one rod (pole) is jointed to each other to form the entire fishing rod, the fishing rod can be formed as a single body that has the above-described features. Although the sectional shape of the tip rod is circular in the above-described embodiment, the sectional shape may be a non-circular shape such as oblong. Moreover, the covering layers 20, 20' may be alternatively formed by dispersing the short fibers in a sheet member impregnated with a synthetic resin and winding the sheet member around the tip rod.

What is claimed is:

1. A fishing rod, comprising:
 a solid tip made of a fiber-reinforced resin material in which reinforced fibers are continuously disposed along an axial direction of the solid tip, the tip being tapered toward a distal end thereof, and
 a covering layer formed on a surface of the tip, the covering layer being made of a fiber-reinforced resin in which short fibers are dispersed in a matrix resin material,
 wherein the short fibers dispersed in the matrix resin material have an average fiber length of 0.5 to 10 mm, and
 wherein the short fibers are dispersed in the matrix resin material such that a ratio of the short fibers that are arranged anisotropically in a radially inner region is larger than a ratio of the short fibers that are arranged anisotropically in a radially outer region.

2. The fishing rod of claim 1, the short fibers dispersed in the matrix resin material have an average fiber diameter of 3 to 15 μm.

3. The fishing rod of claim 1, wherein the covering layer has a thickness of 0.1 to 2 mm.

4. The fishing rod of claim 1, wherein the covering layer is formed in a maximum flexure region of the tip.

5. The fishing rod of claim 1, wherein a means to enhance adhesion between the tip and the covering layer is provided at an interface between the tip and the covering layer.

6. The fishing rod of claim 1, wherein the short fibers are dispersed in the matrix resin material such that a content of the short fibers in a proximal-end area of the solid tip in the axial direction of the solid tip is larger than a content of the short fibers in a distal-end area of the solid tip.

7. The fishing rod of claim 1, wherein the covering layer is formed by insert molding.

8. The fishing rod of claim 1, further comprising:
 a top guide for guiding a fishing line, wherein
 a distal-end area of the covering layer is cut to expose the continuously-disposed reinforced fibers, and the top guide is fitted on an exposed end surface of the reinforced fibers.

9. The fishing rod of claim 1, wherein the solid tip includes a core plate such that the tip tends to bend in one direction.

\* \* \* \* \*